United States Patent
Okman et al.

(10) Patent No.: US 11,550,615 B2
(45) Date of Patent: Jan. 10, 2023

(54) KUBERNETES RESOURCE POLICY ENFORCEMENT

(71) Applicant: SAP SE, Walldorf (DE)

(72) Inventors: Lior Okman, Tzoran-Kadima (IL); Ido Itzkovich, Herzliya (IL)

(73) Assignee: SAP SE, Walldorf (DE)

( * ) Notice: Subject to any disclaimer, the term of this patent is extended or adjusted under 35 U.S.C. 154(b) by 139 days.

(21) Appl. No.: 17/068,949

(22) Filed: Oct. 13, 2020

(65) Prior Publication Data

US 2022/0114003 A1    Apr. 14, 2022

(51) Int. Cl.
  *G06F 9/455*    (2018.01)
  *G06F 9/50*    (2006.01)

(52) U.S. Cl.
  CPC ............ *G06F 9/45558* (2013.01); *G06F 9/50* (2013.01)

(58) Field of Classification Search
  CPC ...... G06F 9/45558; G06F 9/50; G06F 9/5077; H04L 63/20; H04L 41/0893
  See application file for complete search history.

(56) References Cited

U.S. PATENT DOCUMENTS

| | | | | |
|---|---|---|---|---|
| 10,191,778 | B1* | 1/2019 | Yang | H04L 67/1023 |
| 11,070,452 | B1* | 7/2021 | Roy | H04L 43/045 |
| 11,323,327 | B1* | 5/2022 | Chitalia | H04L 63/20 |
| 2020/0401452 | A1* | 12/2020 | Piercey | G06F 9/5016 |
| 2022/0124013 | A1* | 4/2022 | Chitalia | G06F 9/5072 |

OTHER PUBLICATIONS

AlexaKappa.com [online], "Fun with Binary Expression Trees and Go" Apr. 2014, [retrieved on Jan. 12, 2021], retrieved from: URL <https://alexkappa.com/fun-with-tree-structures-and-go-interfaces/>, 8 pages.

Github.com [online], "Tidwall: Restrict Pretty Indent and Prefixes to Whitespace" Dec. 2020, [retrieved on Jan. 12, 2021], retrieved from: URL <https://github.com/tidwall/gjson>.

JSONPatch.com [online], "What is JSON Patch?" Oct. 2014, [retrieved on Jan. 12, 2021], retrieved from: URL <http://jsonpatch.com/>, 7 pages.

PKG.go [online], "Template" Oct. 2020, [retrieved on Jan. 12, 2021], retrieved from: URL <https://pkg.go.dev/text/template?tab=doc>, 21 pages.

* cited by examiner

*Primary Examiner* — Kenneth Tang
(74) *Attorney, Agent, or Firm* — Fish & Richardson P.C.

(57) ABSTRACT

Methods, systems, and computer-readable storage media for executing, by a policy controller, a policy custom resource that defines a policy to be applied to target resources within a cluster of a cloud computing platform, the policy custom resource including a policy target defining parameters for identifying a resource as a target resource, a policy condition defining conditions of a target resource that are to be evaluated, and a policy action defining actions that are to be executed in response to the conditions evaluating to true, receiving, by the policy controller, a set of target resources based on the policy target of the policy custom resource, evaluating, by the policy controller and for each target resource in the set of target resources, the policy condition, and in response to the policy condition returning as true for a target resource, executing the policy action for the target resource.

20 Claims, 4 Drawing Sheets

KUBERNETES RESOURCE POLICY ENFORCEMENT

BACKGROUND

In modern software deployments, containerization is implemented, which can be described as operating system (OS) virtualization. In containerization, applications (or microservices, software processes) are run in isolated user spaces referred to as containers. The containers use the same shared OS, and each provides a fully packaged and portable computing environment. That is, each container includes everything an application needs to execute (e.g., binaries, libraries, configuration files, dependencies). Because a container is abstracted away from the OS, containerized applications can execute on various types of infrastructure. For example, using containers, an application can execute in any of multiple cloud-computing environments.

Container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, which can be described as an open-source container orchestration system for automating computer application deployment, scaling, and management.

At a high level, the Kubernetes platform is made up of a central database containing descriptions of the required states of resources managed in the platform, and a collection of controllers. The controllers monitor the required state of the resources they are tasked to and take any required action to make sure that the actual states of the resources match the required states. The controllers also update the Kubernetes central database with the current resource status. In some instances, a user interacts with the cluster by modifying the required state of a resource and waiting for the relevant controller to modify the actual state of the resource to match.

Kubernetes provides a standard extension mechanism, referred to as custom resource definitions, that enables extension of the set of resources that can be managed. This extension mechanism enables a system to be modeled in the same way as core Kubernetes resources. For example, a set of resources are kept in the central Kubernetes database and a set of controllers monitor these resources and verify that the actual state matches the required state.

In many instances, cluster operators require the ability to fine-tune resources managed by the Kubernetes platform. In some instances, this fine-tuning (also referred to as granular resource management) must consider changes that occur as part of day-to-day occurrences in the system. For example, an operator might require that a certain resource be updated or deleted, if its status changes in a certain way. The conditions on which these resource changes must be evaluated can only be evaluated during the system's runtime. Currently, to achieve this granular resource management, custom controllers need to be developed for each scenario (i.e., scenario-specific controllers). Developing custom controllers is a time- and resource-intensive task. Further, having multiple scenario-specific controllers result in a higher consumption of technical resources (e.g., processors, memory, bandwidth) within the system.

SUMMARY

Implementations of the present disclosure are directed to a policy custom resource for container orchestration systems. More particularly, implementations of the present disclosure are directed to a policy custom resource that enables definition and enforcement of continuously evaluated dynamic policies on resources deployed within a container orchestration system. As described in further detail herein, implementations of the present disclosure achieve this without having to create separate, scenario-specific controllers for each resource that is subject to a policy.

In some implementations, actions include executing, by a policy controller, a policy custom resource, the policy custom resource defining a policy that is to be applied to one or more target resources within a cluster of a cloud computing platform, the policy custom resource including a policy target defining one or more parameters for identifying a resource as a target resource, a policy condition defining one or more conditions of a target resource that are to be evaluated, and a policy action defining one or more actions that are to be executed in response to the one or more conditions evaluating to true, receiving, by the policy controller, a set of target resources based on the policy target of the policy custom resource, evaluating, by the policy controller and for each target resource in the set of target resources, the policy condition, and in response to the policy condition returning as true for a target resource, executing the policy action for the target resource. Other implementations of this aspect include corresponding systems, apparatus, and computer programs, configured to perform the actions of the methods, encoded on computer storage devices.

These and other implementations can each optionally include one or more of the following features: the policy custom resource and the set of target resources are each received through an application programming interface (API) of the container orchestration system; the policy action of the policy custom resource includes one or more of a modify action, a notification action, and a delete action; a resource of the cluster is included in the set of target resources in response to one or more of a type and a label associated with the resource being defined in the policy target; the policy condition of the policy custom resource includes a call to one or more functions executed by the policy controller and a binary expression tree; actions further include executing at least a portion of the policy custom resource for testing in response to the policy custom resource including an annotation representative of test execution; and the set of target resources includes a set of identifiers, each identifier uniquely identifying a respective resource within the cluster.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a policy custom resource for container orchestration systems. More particularly, implementations of the present disclosure are directed to a policy custom resource that enables definition and enforcement of continuously evaluated dynamic policies on resources deployed within a container orchestration system. As described in further detail herein, implementations of the present disclosure achieve this without having to create separate, scenario-specific controllers for each resource that is subject to a policy. Implementations can include actions of executing, by a policy controller, a policy custom resource, the policy custom resource defining a policy that is to be applied to one or more target resources within a cluster of a cloud computing platform, the policy custom resource including a policy target defining one or more parameters for identifying a resource as a target resource, a policy condition defining one or more conditions of a target resource that are to be evaluated, and a policy action defining one or more actions that are to be executed in response to the one or more conditions evaluating to true, receiving, by the policy controller, a set of target resources based on the policy target of the policy custom resource, evaluating, by the policy controller and for each target resource in the set of target resources, the policy condition, and in response to the policy condition returning as true for a target resource, executing the policy action for the target resource.

Implementations of the present disclosure are described in further detail herein with reference to an example software system. The example software system includes SAP Business Application Studio provided by SAP SE of Walldorf, Germany. SAP Business Application Studio can be described as a cloud platform service that provides a modular development environment tailored for efficient development of business applications for enterprises. In some examples, SAP Business Application Studio provides developers with one or more development spaces (e.g., development environments akin to integrated development environments (IDEs)), and each developer can customize tools that are to be installed on a respective development space. In the context of the present disclosure, a development space is provided as a resource within a container orchestration system, such as Kubernetes.

Implementations of the present disclosure are described in further detail with reference to SAP Business Application Studio. It is contemplated, however, that implementations of the present disclosure can be applied to any appropriate software system having resources executed within a container orchestration system, such as Kubernetes.

To provide further context for implementations of the present disclosure, and as introduced above, container orchestration automates the deployment, management, scaling, and networking of containers. For example, container orchestration systems, in hand with underlying containers, enable applications to be executed across different environments (e.g., cloud computing environments) without needing to redesign the application for each environment. Enterprises that need to deploy and manage a significant number of containers (e.g., hundreds or thousands of containers) leverage container orchestration systems. An example container orchestration system is the Kubernetes platform, maintained by the Cloud Native Computing Foundation, can be described as an open-source container orchestration system for automating computer application deployment, scaling, and management.

At a high level, the Kubernetes platform is made up of a central database containing descriptions of the required states of resources managed in the platform, and a collection of controllers. The controllers monitor the required state of the resources they are tasked to and take any required action to make sure that the actual states of the resources match the required state. The controllers also update the Kubernetes central database with the current resource status. In some instances, a user interacts with the cluster by modifying the required state of a resource and waiting for the relevant controller to modify the actual state of the resource to match.

Kubernetes provides a standard extension mechanism, referred to as custom resource definitions, that enables extension of the set of resources that can be managed. This extension mechanism enables a system to be modeled in the same way as core Kubernetes resources. For example, a set of resources are kept in the central Kubernetes database and a set of controllers monitor these resources and verify that the actual state matches the required state.

In many instances, cluster operators require the ability to fine-tune resources managed by the Kubernetes platform. In some instances, this fine-tuning (also referred to as granular resource management) must consider changes that occur as part of day-to-day occurrences in the system. For example, an operator might require that a certain resource be updated or deleted, if its status changes in a certain way. The conditions on which these resource changes must be evaluated can only be evaluated during the system's runtime. Currently, to achieve this granular resource management, custom controllers need to be developed for each scenario (i.e., scenario-specific controllers), which can be time- and resource-intensive. Further, multiple scenario-specific controllers result in a higher consumption of technical resources (e.g., processors, memory, bandwidth) within the system.

In view of the above context, implementations of the present disclosure provide a policy custom resource that enables definition and enforcement of continuously evaluated dynamic policies on resources deployed within a container orchestration system. As described in further detail herein, implementations of the present disclosure achieve this without having to create separate, scenario-specific controllers for each resource that is subject to a policy.

For purposes of illustration, an example use case can be considered, in which, resources are allocated to tenants. For example, a tenant can include a user of SAP Business Application Studio, and resources can be allocated to provide a development environment for the user. The resources are allocated in a cluster of a container orchestration system (e.g., the Kubernetes platform). The cluster operator (e.g., SAP SE in the non-limiting example) maintains a policy to have the resources to be completely deleted X days (e.g., 60 days) after the tenant is removed. In this manner, time is provided before resources are deleted in case the tenant changes their mind and again uses the resources. As a result, the resources allocated to the tenant can be marked with a timestamp denoting the time the tenant was offboarded from the system. In a traditional arrangement, however, the cluster administrator would need to repeatedly check the timestamp within the X days time period in order to determine when the resources are to be deleted. As described in further detail herein, implementations of the present disclosure address this through provision of a policy custom resource that can automatically update and check the status of the resources and delete the resources at the appropriate time. This is achieved without specifically creating functionality for each type of resources that needs to be deleted. That is, the policy custom resource of the present disclosure avoids having to code this functionality into controllers for each and every type of resource that must be deleted, in this example use case.

Another example use case can be considered, in which types of resources reference each other. Here, the cluster operator would need to constantly verify that all referenced resources still exist in the system so that no broken references exist. This verification is made to ensure that the system is in a correct state at any given moment. However, in a traditional arrangement, it is difficult for the cluster operator to perform such verification, because the cluster operator would need to constantly verify various resources in the cluster all of the time. As described in further detail herein, implementations of the present disclosure address this through provision of a policy custom resource that can regularly check for any inconsistencies and automatically handle inconsistencies based on predefined actions.

Figure 1:
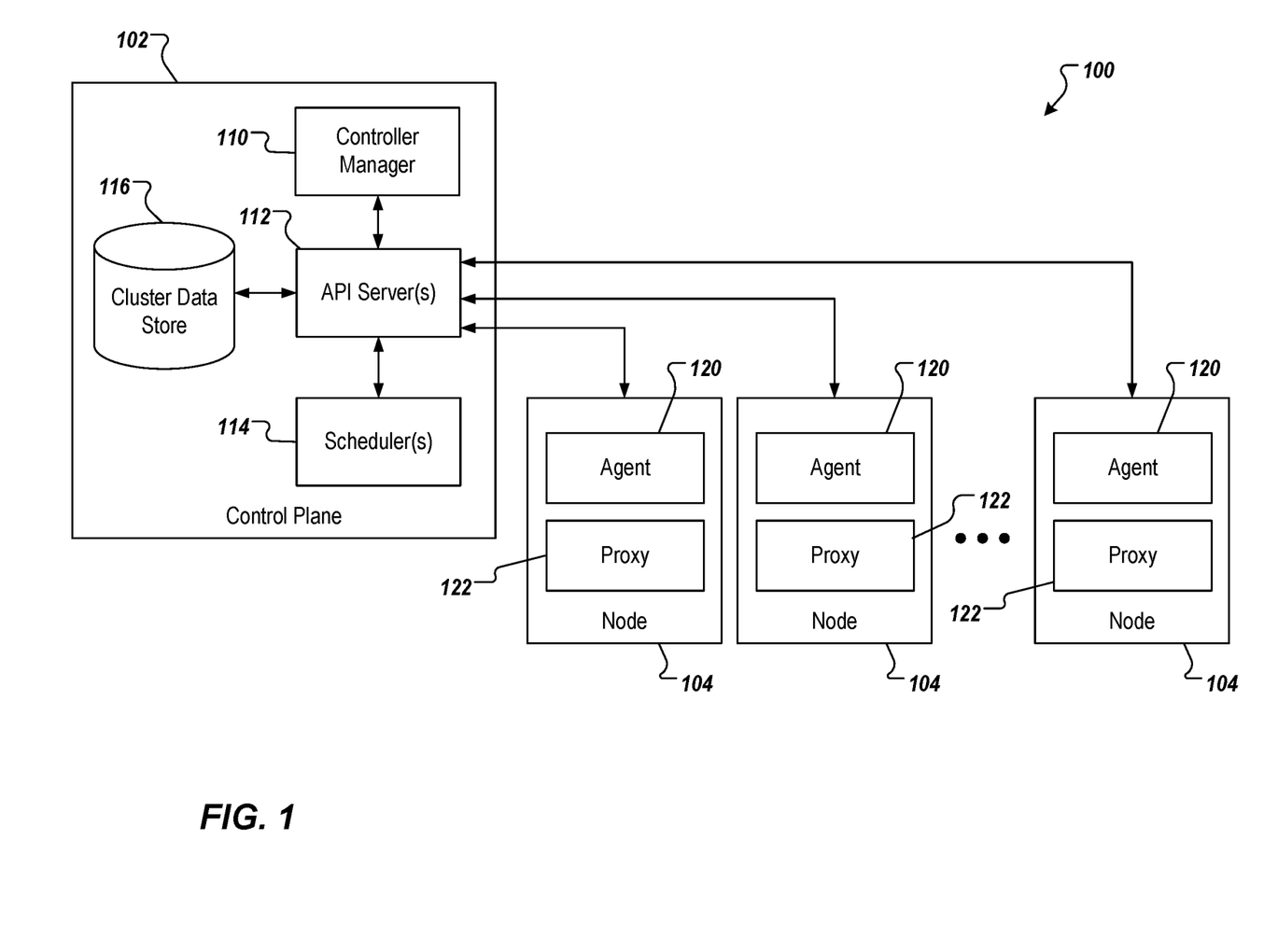
FIG. 1 depicts an example architecture that can be used to execute implementations of the present disclosure.

FIG. 1 depicts an example architecture 100 in accordance with implementations of the present disclosure. In the depicted example, the example architecture 100 deployment of a portion of a container orchestration system, Kubernetes introduced above. More particularly, the example architecture 100 represents a basic structure of a cluster within Kubernetes In the example of FIG. 1, the example architecture 100 includes a control plane 102 and a plurality of nodes 104. Each node 104 can represent physical worker machines and are configured to host pods. In Kubernetes, a pod is the smallest deployable unit of resources and each pod is provided as one or more containers with shared storage/network resources, and a specification for how to run the containers. The control plane 102 communicates with the nodes 104 and is configured to manage all of the nodes 104 and the pods therein.

In further detail, the control plane 102 is configured to execute global decisions regarding the cluster as well as detecting and responding to cluster events. In the example of FIG. 1, the control plane 102 includes a control manager 110, one or more application programming interface (API) server(s) 112, one or more scheduler(s) 114, and a cluster data store 116. The API server(s) 112 communicate with the nodes 104 and exposes the API of Kubernetes to exchange information between the nodes 104 and the components in the control plane 102 (e.g., the cluster data store 116). In some examples, the control plane 102 is set with more than one API server(s) 112 to balance the traffic of information exchanged between the nodes 104 and the control plane 102. The scheduler(s) 114 monitor the nodes 104 and execute scheduling processes to the nodes 104. For example, the scheduler(s) 114 monitors events related to newly created pods and selects one of the nodes 104 for execution, if the newly created pods are not assigned to any of the nodes 104 in the cluster.

The cluster data store 116 is configured to operate as the central database of the cluster. In this example, resources of the cluster and/or definition of the resources (e.g., the required state and the actual state of the resources) can be stored in the cluster data store 116. The controller manager 110 of the control plane 102 communicates with the nodes 104 through the API server(s) 112 and is configured to execute controller processes. The controller processes can include a collection of controllers and each controller is responsible for managing at least some or all of the nodes 104. The management can include, but is not limited to, noticing and responding to nodes when an event occurs, and monitoring the resources of each node (and the containers in each node). In some examples, the controller in the controller manager 110 monitors resources stored in the cluster data store 116 based on definitions of the resource. As introduced above, the controllers also verify whether the actual state of each resource matches the required state. The controller is able to modify or adjust the resources, so that actual state matches the required state depicted in the corresponding definition of the resources.

In some examples, the controllers in the controller manager 110 should be logically independent of each other and be executed separately. In some examples, the controller processes are all compiled into one single binary that is executed in a single process to reduce system complexity. It is noted the control plane 102 can be run/executed on any machine in the cluster. In some examples, the control plane 102 is run on a single physical worker machine that does not host any pods in the cluster.

In some implementations, custom controllers and custom resource definitions can be built (e.g., by the administrator or operator of the cluster) for extensions of the resources. The set of resources can be kept in the cluster data store 116 of control plane 102 and a custom controller can be configured to manage the resources based on the custom resource definition. For example, the custom controller can be configured to verify if the actual state of the resources matches the required state defined in the custom resource definition. It is noted that the custom controllers can be configured to be executed within the controller manager 110 of the control plane 102. In some examples, the custom controller is set and executed on one of the nodes 104 in the cluster.

In the example of FIG. 1, each node 104 includes an agent 120 and a proxy 122. The agent 120 is configured to ensure that the containers are appropriately executing within the pod of each node 104. The agent 120 is referred to as a kubelet in Kubernetes. The proxy 122 of each node 104 is a network proxy that maintains network rules on nodes 104. The network rules enable network communication to the pods in the nodes 104 from network sessions inside or outside of the cluster. The proxy 122 is a kube-proxy in Kubernetes.

In accordance with implementations of the present disclosure, and as noted above, the present disclosure provides a policy custom resource that enables changes to be made to resources during runtime without separately creating specific controllers for each resource that is subject to an underlying policy. That is, the policy can be applied to multiple resources and the policy custom resource enables application of the policy to the multiple resources. This obviates the need for multiple controllers, which would have been required in traditional approaches.

In accordance with implementations of the present disclosure, the policy custom resource includes a policy target, a policy condition, and a policy action, which can be respectively conceptualized as "who," "when," and "what." The policy target can be referred as a definition of which resources in the cluster is selected to be monitored ("who"). The policy condition defines a condition to be evaluated on the policy target (i.e., the selected and monitored resources) to determine whether an action should be taken ("when"). The policy action is the action that should be taken, if the policy condition is evaluated as true ("what"). Since all of the resources in the cluster of Kubernetes can be queried in the central database (i.e., the cluster data store 116 of the control plane 102), the policy target can be set from high-leveled (abstract) to low-leveled (granular) based on the needs or wants of the cluster operator. In some examples, the policy condition includes consideration of attributes from the monitored resources (e.g., the resources selected as the policy target).

In accordance with implementations of the present disclosure, the cluster operator (e.g., the enterprise provisioning the cluster, such as, for example, SAP SE in provisioning clusters for users of SAP Business Application Studio) can introduce and build policy custom resources for use in the cluster. By this, the policy custom resources can monitor and react to changes occurring in the cluster on the cluster level without implementing code representative of the policy custom resources into respective controllers.

As described in further detail herein, the policy mechanism of the present disclosure (i.e., the policy custom resource) enables the cluster operator to add an additional layer of logic (e.g., business logic) to move an application from one supported state to another state. In some examples, the policy custom resource can be configured to provide predetermined system rules operating in the cluster, such as system-state based, time-based, or resource-changed-based operations. In some examples, the policy custom resource can be configured to deal with runtime maintenance to address bugs or abnormal states. In some examples, the policy custom resource can be configured to help a third-party cluster operator perform maintenance without being an expert in the domain of an application executing within the cluster. The policy mechanism can also be beneficial to support the third-party cluster operator to have access to the cluster and develop additional custom controllers and deploy these controllers to the cluster.

Figure 2:
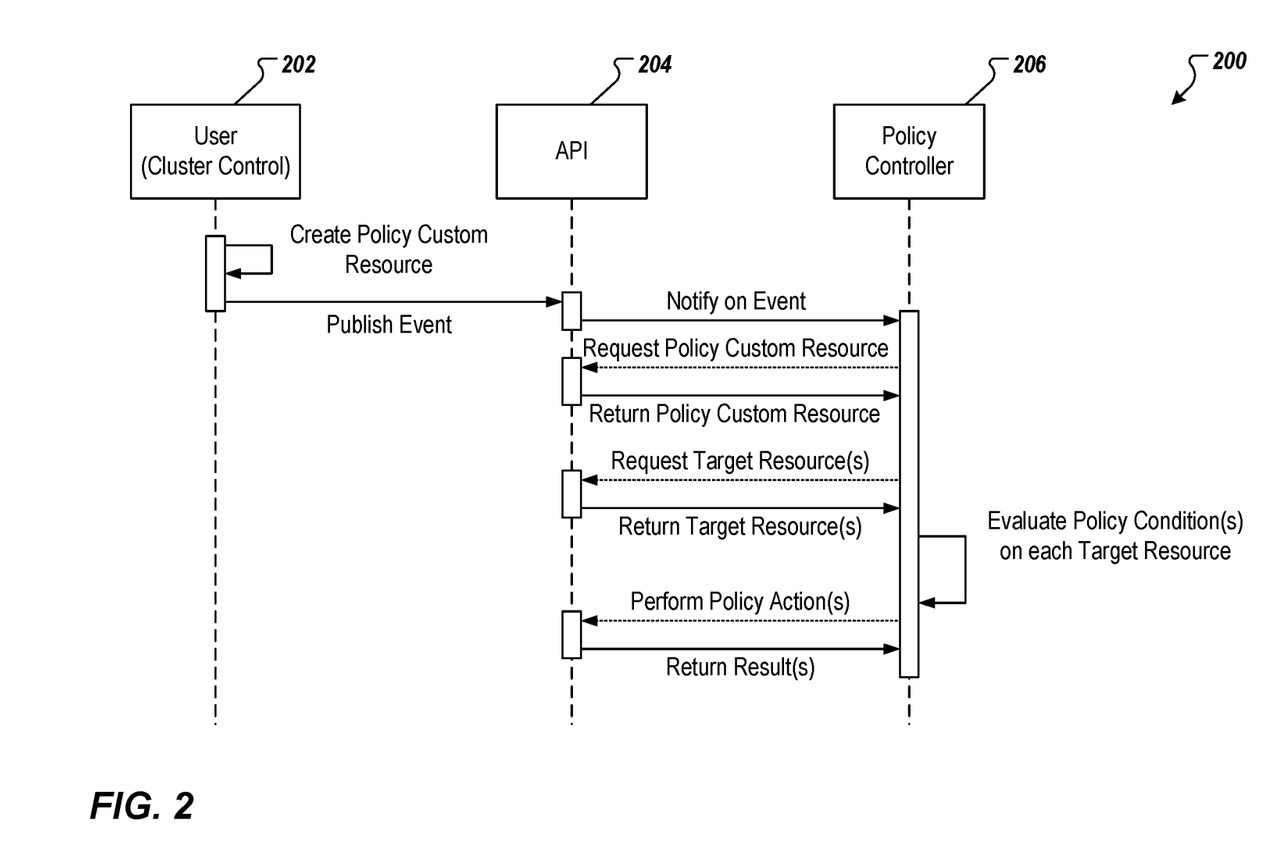
FIG. 2 depicts an example flow diagram in accordance with implementations of the present disclosure.

FIG. 2 depicts an example flow diagram 200 in accordance with implementations of the present disclosure. In the depicted example, the example flow diagram 200 depicts communication between various components in accordance with implementations of the present disclosure. As discussed above, a user 202 (e.g., an employee or agent of the cluster operator) can create a policy custom resource that is deployed to the cluster. The user 202 can be referred to as the cluster control (e.g., an administrator of the cluster or the cluster operator). In Kubernetes, the user 202 can create policy custom resources using kubectl, which can be described as a command line tool that enables control of Kubernetes clusters.

In some implementations, the policy custom resource can be used to describe a desired state for specific resources (i.e., the policy target) in the cluster and starts an action (i.e., the policy action) to move the resources to this desired state under certain condition(s) (i.e., the policy condition(s)). For example, the policy custom resource can be configured to, for example and without limitation define: a target object that declares how to select the resources that the policy is to be applied to; a condition to be tested on the selected resource(s), which is evaluated at runtime; the action to perform on each resource when the condition(s) is/are met; a time interval for how often the condition should be checked; a "done" condition that is resolved to true if and only if the resource would be unchanged by having the policy applied to it (i.e., was already affected by this policy in an earlier iteration); and/or a percentage value, which describes the percentage-amount of the targeted resources that meet the policy condition that action is to be taken on.

In the example depicted in FIG. 2, the policy controller 206 can be provided as a Kubernetes custom controller for instances of the policy custom resource. The policy controller 206 communicates with the API 204 (e.g., the API server 112 depicted in FIG. 1). In this example, the policy controller 206 can be implemented with an informer-based controller with a relatively short resync interval. In some examples, the policy controller 206 can be implemented within the control plane of the cluster (e.g., in the controller manager 110) or within a node of the cluster (e.g., a node 104). In the example of FIG. 2, after the user 206 creates the policy custom resource, the user 202 can publish an event regarding the policy custom resource to the API 204. The policy controller 206 can be notified regarding the event by the API 204. The policy controller 206 may request the policy custom resource from the API 204. After retrieving the policy custom resource from the API 204, the policy controller 206 is able to deploy the policy custom resource within the cluster.

As discuss further detail herein, the policy custom resource includes the policy target, the policy condition and the policy action. In this example, when the policy controller 206 deploys the policy custom resource, the policy target, the policy condition and the policy action can be performed sequentially and iteratively.

In some implementations, the policy controller 206 requests target resources through the API 204 for each object handled by the policy controller 206. The target resources can include resources that are targets of the policy as defined in the policy target (i.e., resources that the policy is to be applied to). In some examples, the policy target may define the target resources by a type/kind of resources. In some examples, the resources are pre-labeled. The policy controller 206 is able to identify resources as target resources based on the labels and further request the target resources using a label selector. Upon receiving a request of target resources, the API 204 returns the target resources to the policy controller 206.

In some implementations, when the policy controller 206 receives the target resources from the API 204 (e.g., receives a set of identifiers, each identifier uniquely identifying a resource that the policy is to be applied to), the policy controller 206 filters the target resources by evaluating condition provided in the policy condition. In some examples, the policy condition can be provided as an expression and an output of Boolean value (e.g., true or false). The output of the policy condition is determined for each target resource based on the evaluation to the expression. In the situation where a status of a target resource meets the condition described in the expression, the output of the policy condition will be set "true," and action described in the policy action will be performed for the respective target resource. In other words, the policy condition is configured as a filter to the target resources and the policy action may be applied to the target resources that passes the filter.

In some examples, the expression of the policy condition can be implemented by calls to custom functions. Such custom functions can be implemented in the policy controller or other controllers in the cluster. In some examples, a policy condition can be expressed as a binary expression tree. In some examples, a policy condition can be implemented by calling, for example and without limitation, the following example functions: a timeNow( ) function to provide the current date-and-time, which can then be compared to another date-and-time value using a standard comparison; a resourceData(path) function that fetches a value from the target resources based on a provided path (e.g., by the user 202); a getParamStr(name) function that fetches the value of a parameter from a controller parameters "config-map" of the policy controller 206 as a string; a getParamFloat64(name) function that fetches the value of a parameter from the controller parameters "config-map" of the policy controller 206 as a float64 number; an addDuration(time, interval) function that adds the interval to the provided time set in the policy condition; and a subtractDuration(time, interval) function that subtracts a time interval from the provided time.

As described herein, the policy action can be applied to a target resource that a policy condition returns "true" for upon evaluation of the policy condition. The policy controller 206 can perform the policy action to the target resource through the API 204, for example, and receives the result of the policy action from the API 204. The result of performing the policy action can be the basis of executing the policy custom resource in a next iteration.

In some examples, the policy action includes a modify action. In some examples, the modify action can be implemented by using a JavaScript Object Notation (JSON) patch. The JSON patch action can be used to describe changes to the target resource. In other words, the JSON patch action can be configured to modify the target resources. For example, a JSON patch action can be configured to add a label to the target resources after the target resources are checked. An example JSON patch action can be provided as:

```
spec:
  actions:
  - type: "JsonPatch"
    payload: |
      [
        {"op": "add", "path": "/metadata/labels/policyLabel",
"value": "mySpecialLabel" }
      ]
```

In some examples, because the policy custom resource can be executed periodically and iteratively, a JSON patch action can be set and used to constantly update the target resources. In this manner, the actual state of a target resource can be gradually changed and is able to meet the required state set in the policy custom resource. As a result, fine-tuning of resources can be achieved. In some examples, because the API 204 in the Kubernetes platform accepts JSON patch payloads, JSON patch actions can be directly sent to the API 204 without executing any extra processing in the policy controller 206.

With reference to an example use case, a cluster operator can define a policy for a cluster that sets a maximum duration for an environment (e.g., a development environment executed by resources within the cluster) provided to a tenant. The maximum duration can be provided in an effort to reduces system costs (e.g., technical resources expended to maintain the environment within the cluster). In this example, the environment can be suspended or shut-down, if the operating time of the environment exceeds the maximum duration (e.g., 14 hours). To achieve this, a policy condition can define the maximum duration (e.g., using a combination of addDuration( ) and timeNow( ) functions). Further, the policy action can be set as a JSON patch action that modifies the status of the environment to suspended, upon expiration of the maximum duration. To achieve this, an example policy can be provided as:

```
kind: ResourcePolicy
apiVersion: devx.sap.com/v1
metadata:
  name: workspaces-hard-suspend-policy
  namespace: { { .Values.global.systemNamespace } }
spec:
  about:
    provider: SAP
    description: Automatically suspends stalled running
workspaces after predefined time
  target:
    kind: Workspace
    labelSelector:
      matchLabels:
        ws-manager.devx.sap.com/deleted 'false'
  condition:
    stringCondition: >-
      resourceData('metadata.annotations.ws-
manager\\.devx\\.sap\\.com/startedAt') != "" &&
      addDuration(resourceData('metadata.annotations.ws-
manager\\.devx\\.sap\\.com/startedAt'),"14h") < timeNow( )
  actions:
  - type: "JsonPatch"
    payload: |
      [
        { "op": "replace", "path": "/spec/suspended",
          "value": true },
        { "op": "replace", "path":
          "/metadata/annotations/ws-
manager.devx.sap.com~1startedAt", "value": "" }
      ]
```

In some examples, an example policy action can include a notification action. For example, the notification action can be executed to create a Kubernetes event with a provided message regarding the evaluated target resources. As the events are created, a monitoring service in the cluster can received the events and propagate the events to a destination (e.g., a user interface (UI) to be displayed to the user 202, a controller in the cluster to that can act upon the event). In this example, the payload content (i.e., the provided message) supports standard Go templating (Go being an open source programming language) and resources can be allocated for the event. For example, a notification action can be configured to send a notification with a resource identifier (resource name) in the text of the notification (e.g., "Detected workspace {{.Resource.Name}} with missing mandatory extensions"). The user 202 may receive such notification and proceed to tasks corresponding to this notification (e.g., correct the missing mandatory extensions). An example notification action can be provided as:

```
spec:
  actions:
  - type: "Notification"
      payload: "Detected workspace { { .Resource.Name } } with
missing mandatory extensions"
```

In some examples, and with reference to an example use case introduced above, an example policy action can include a delete action. The delete action can be configured to delete a target resource in the cluster. For example, the cluster operator can have a policy to completely delete a resource that has been allocated to a tenant X days (e.g., 7 days) after the tenant is removed from the system. For example, an environment that is created for a tenant can be represented as a custom resource (e.g., a workspace in Kubernetes). In some examples, after a tenant requests the environment to be deleted, a label can be added to mark the environment as "deleted," but the environment is not actually deleted within the system. In this example, the policy custom resource can be defined to delete the resource that provides the environment X days after labeled as deleted (e.g., using a combination of addDuration( ) and timeNow( ) functions). The policy action can be set as a delete action to delete the resource when the condition set in the policy condition is met. To achieve this, an example policy can be provided as:

```
kind: ResourcePolicy
apiVersion: devx.sap.com/v1
metadata:
  name: workspaces-deletion-policy
  namespace: { { .Values.global.systemNamespace } }
spec:
  about:
    provider: SAP
    description: This policy automatic delete Workspaces that
marked for deletion
  target:
    kind: Workspace
    labelSelector:
      matchLabels:
        ws-manager.devx.sap.com/deleted : "true"
  condition:
    stringCondition: >-
      addDuration(resourceData('metadata.annotations.ws-
manager\.devx\.sap\.com/deletedAt'),"7d") < timeNow( )
  actions:
  - type: DeleteResource
```

In another example use case a specific application, referred to as a workspace resource controller, executes within a cluster and has a relatively complex upgrade method. For technical reasons, during an upgrade of the application the old version (e.g., V1) of the application cannot simply be replaced with the new version (e.g., V2) of the application. Instead, the old version must remain in the system for some time (even a number of days) before it is deleted. The old version will only handle the workspaces that it had from before the upgrade, and the new version will pick up any new workspaces. To achieve the upgrade, the workspaces of the old version are moved from a controller (old controller) to another controller (new controller). This is to be achieved by picking up any of the old workspaces (controlled by the old controller) and, if they are currently offline, move them to the new controller. This can be achieved using the following example policy:

```
kind: ResourcePolicy
apiVersion: devx.sap.com/v1
metadata:
  name: ws-controller-deployer-controller-id-removal
  namespace: { { .Values.global.systemNamespace } }
spec:
  about:
    provider: SAP
    description: Remove the controllerID label from suspended
workspaces that are not controlled by the latest controller
  target:
    kind: Workspace
  condition:
    stringCondition: |
      resourceData('spec.suspended') == true &&
!contains(resourceData('metadata.labels.controllerID'), ' { {
.Values.chartParts.version } } ')
  actions:
  - type: "JsonPatch"
      payload: |
        [
          { "op": "remove", "path":
            "/metadata/labels/controllerID" }
        ]
```

Implementations of the present disclosure further enable testing of policies (e.g., evaluating policies) before actual implementation on a cluster. That is, a mechanism is provided to enable the policy developer (e.g., the user 202), for example, to test the evaluation of a policy condition of a policy without affecting the actual resources in the cluster that the policy would be applied to. In some implementations, the mechanism can be implemented by adding an annotation (e.g., "dryrun") to the policy custom resource. The annotation denotes that the respective policy custom resource should not be fully performed, but rather only evaluated for testing purposes. For example, the annotation could be added to the policy target (e.g., "dryrun: target"). In this example, the annotation can result in the controller evaluating the policy condition for target resources. By applying this annotation, the resources that the policy would be applied to are listed (e.g., displayed to the user 202 in a UI), but the policy controller 206 does not evaluate the policy condition(s). In some examples, the annotation is also applied to the policy condition(s) (e.g., "dryrun: condition"). By applying this annotation, the target resources that evaluate to true for the policy condition(s) are listed (e.g., displayed to the user 202 in a UI), but the policy controller 206 does not execute the policy action on the target resources. In some examples, a policy development command-line interface (CLI) can be provided to enable the user 202 to easily add/remove the annotations from policy custom resources. As a result, output can be viewed by the user 202 as the output would be parsed out to the status section of the policy development CLI.

Figure 3:
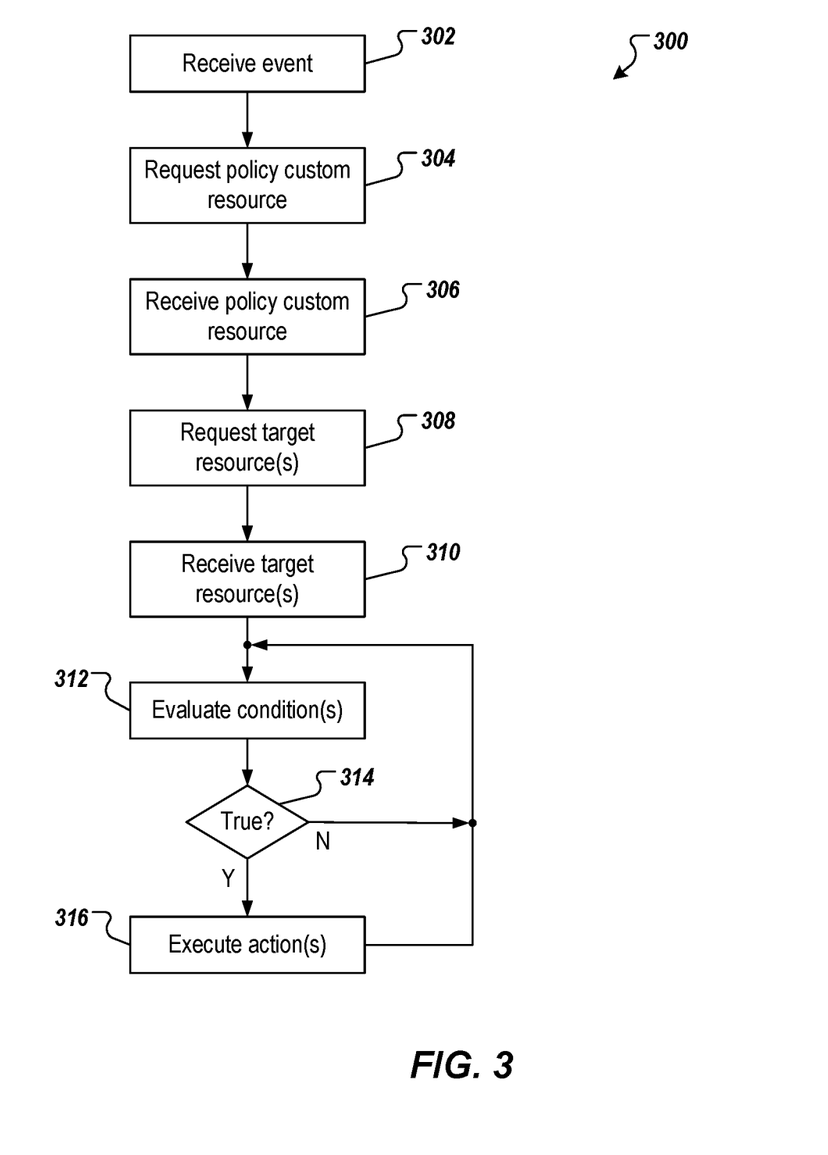
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable program executed by one or more computing devices. In some examples, the example process 300 is executed for each policy custom resource that is created for a cluster.

An event is received (302). For example, a policy controller (e.g., the policy controller 206 of FIG. 2) receives an event published through an API (e.g., published by the user 202 through the API 204). In some examples, the event indicates deployment of a policy custom resource to the cluster. The policy custom resource is requested (304) and received (306). For example, in response to the event, the policy controller requests the policy custom resource and receives the policy custom resource (e.g., as a computer-readable filed). As described in further detail herein, the policy custom resource includes a policy target defining one or more parameters (e.g., type, label) for identifying a resource as a target resource, a policy condition defining one or more conditions of a target resource that are to be evaluated, and a policy action defining one or more actions that are to be executed in response to the one or more conditions evaluating to true.

The target resources are requested (308) and received (310). For example, and as described herein, the policy controller submits a request for a set of target resources, the request including the one or more parameters for defining a resource of the cluster as a target resource. By way of non-limiting example, an example parameter can include a label (e.g., deleted) and any resource in the cluster associated with the label is identified as a target resource and is included in the set of target resources. In some examples, the set of target resources is provided as a set of identifiers, each identifier (e.g., resource name) uniquely identifying a respective resource within the cluster.

One or more conditions are evaluated (312). For example, and as described herein, for each target resource in the set of target resources, the policy condition of the policy custom resource is evaluated. It is determined whether the one or more conditions return as true (314). In some examples, the policy condition returns as true if each of the one or more conditions return as true. In some examples, the policy condition returns as true if at least one or more conditions return as true. If the one or more conditions do not return as true, the example process 300 loops back. If the one or more conditions return as true, one or more actions are executed (316).

Figure 4:
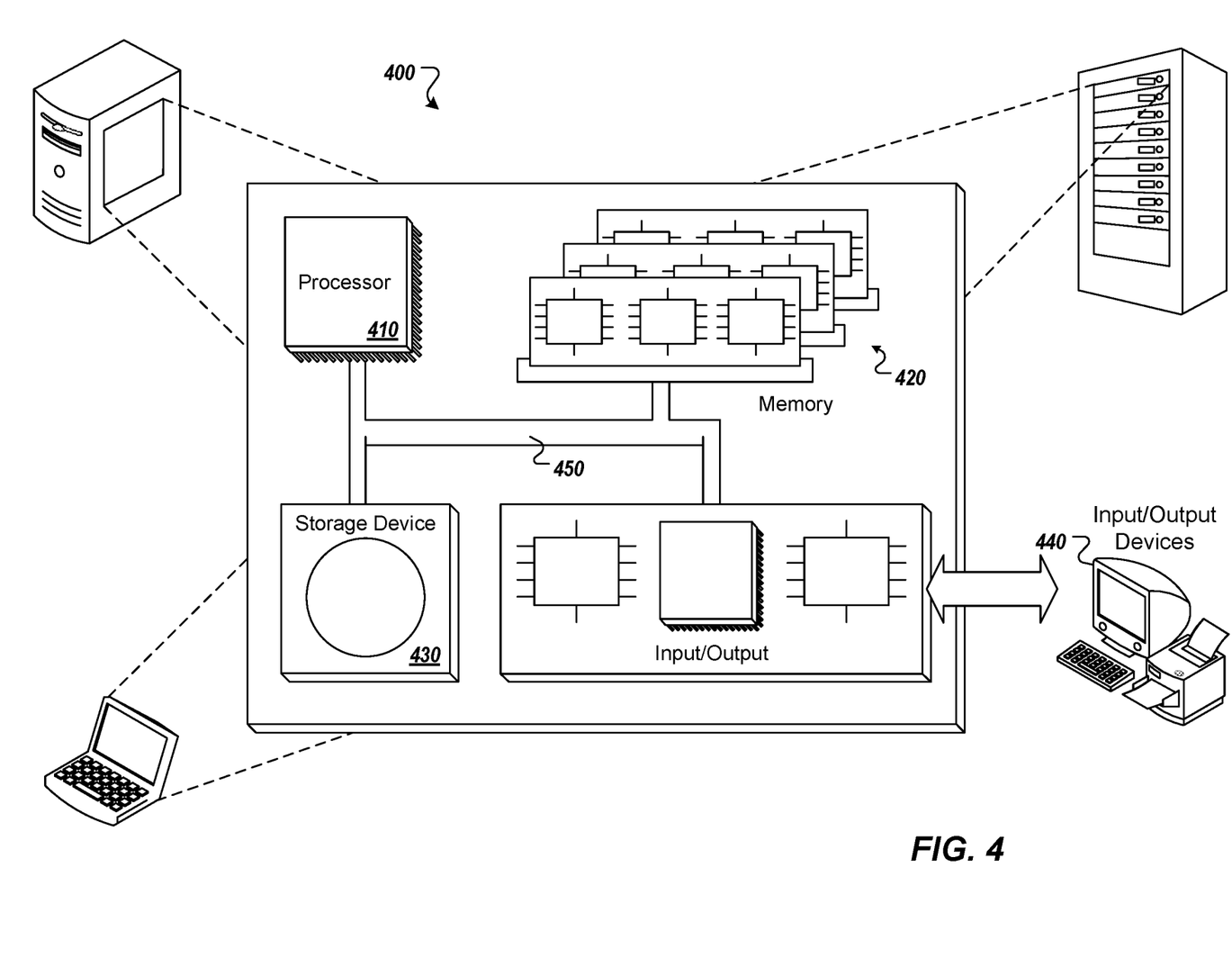
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing a plurality of resources in a container orchestration system, the method being executed by one or more processors and comprising:
    executing, by a policy controller, a policy custom resource, the policy custom resource defining a policy that is to be applied to one or more target resources within a cluster of a cloud computing platform, the policy custom resource comprising a policy target defining one or more parameters for identifying a resource as a target resource, a policy condition defining one or more conditions of a target resource that are to be evaluated, and a policy action defining one or more actions that are to be executed in response to the one or more conditions evaluating to true;
    receiving, by the policy controller, a set of target resources based on the policy target of the policy custom resource;
    evaluating, by the policy controller and for each target resource in the set of target resources, the policy condition; and
    in response to the policy condition returning as true for a target resource, executing the policy action for the target resource and executing a patch action to add a label to the target resource representing a state of the target resource after execution of the policy action.

2. The method of claim 1, wherein the policy custom resource and the set of target resources are each received through an application programming interface (API) of the container orchestration system.

3. The method of claim 1, wherein the policy action of the policy custom resource comprises one or more of a modify action, a notification action, and a delete action.

4. The method of claim 1, wherein a resource of the cluster is included in the set of target resources in response to at least a type associated with the resource being defined in the policy target.

5. The method of claim 1, wherein the policy condition of the policy custom resource comprises a call to one or more functions executed by the policy controller and a binary expression tree.

6. The method of claim 1, further comprising executing at least a portion of the policy custom resource for testing in response to the policy custom resource comprising an annotation representative of test execution.

7. The method of claim 1, wherein the set of target resources comprises a set of identifiers, each identifier uniquely identifying a respective resource within the cluster.

8. A non-transitory computer-readable storage medium coupled to one or more processors and having instructions stored thereon which, when executed by the one or more processors, cause the one or more processors to perform operations for managing a plurality of resources in a container orchestration system, the operations comprising:
    executing, by a policy controller, a policy custom resource, the policy custom resource defining a policy that is to be applied to one or more target resources within a cluster of a cloud computing platform, the policy custom resource comprising a policy target defining one or more parameters for identifying a resource as a target resource, a policy condition defining one or more conditions of a target resource that are to be evaluated, and a policy action defining one or more actions that are to be executed in response to the one or more conditions evaluating to true;
    receiving, by the policy controller, a set of target resources based on the policy target of the policy custom resource;
    evaluating, by the policy controller and for each target resource in the set of target resources, the policy condition; and
    in response to the policy condition returning as true for a target resource, executing the policy action for the target resource and executing a patch action to add a label to the target resource representing a state of the target resource after execution of the policy action.

9. The computer-readable storage medium of claim 8, wherein the policy custom resource and the set of target resources are each received through an application programming interface (API) of the container orchestration system.

10. The computer-readable storage medium of claim 8, wherein the policy action of the policy custom resource comprises one or more of a modify action, a notification action, and a delete action.

11. The computer-readable storage medium of claim 8, wherein a resource of the cluster is included in the set of target resources in response to at least a type associated with the resource being defined in the policy target.

12. The computer-readable storage medium of claim 8, wherein the policy condition of the policy custom resource comprises a call to one or more functions executed by the policy controller and a binary expression tree.

13. The computer-readable storage medium of claim 8, wherein operations further comprise executing at least a portion of the policy custom resource for testing in response to the policy custom resource comprising an annotation representative of test execution.

14. The computer-readable storage medium of claim 8, wherein the set of target resources comprises a set of identifiers, each identifier uniquely identifying a respective resource within the cluster.

15. A system, comprising:
    a computing device; and
    a computer-readable storage device coupled to the computing device and having instructions stored thereon which, when executed by the computing device, cause the computing device to perform operations for managing a plurality of resources in a container orchestration system, the operations comprising:
        executing, by a policy controller, a policy custom resource, the policy custom resource defining a policy that is to be applied to one or more target resources within a cluster of a cloud computing platform, the policy custom resource comprising a policy target defining one or more parameters for identifying a resource as a target resource, a policy condition defining one or more conditions of a target resource that are to be evaluated, and a policy action defining one or more actions that are to be executed in response to the one or more conditions evaluating to true;

receiving, by the policy controller, a set of target resources based on the policy target of the policy custom resource;

evaluating, by the policy controller and for each target resource in the set of target resources, the policy condition; and in response to the policy condition returning as true for a target resource, executing the policy action for the target resource and executing a patch action to add a label to the target resource representing a state of the target resource after execution of the policy action.

16. The system of claim 15, wherein the policy custom resource and the set of target resources are each received through an application programming interface (API) of the container orchestration system.

17. The system of claim 15, wherein the policy action of the policy custom resource comprises one or more of a modify action, a notification action, and a delete action.

18. The system of claim 15, wherein a resource of the cluster is included in the set of target resources in response to at least a type associated with the resource being defined in the policy target.

19. The system of claim 15, wherein the policy condition of the policy custom resource comprises a call to one or more functions executed by the policy controller and a binary expression tree.

20. The system of claim 15, wherein operations further comprise executing at least a portion of the policy custom resource for testing in response to the policy custom resource comprising an annotation representative of test execution.

* * * * *